United States Patent
Chen et al.

(10) Patent No.: US 10,198,087 B2
(45) Date of Patent: Feb. 5, 2019

(54) MOUSE WITH TRANSLATING MODULE

(71) Applicant: Corsair Memory, Inc., Fremont, CA (US)

(72) Inventors: Chiu Wei Chen, Fremont, CA (US); Felix Guerra, Fremont, CA (US); Jason Christian, Fremont, CA (US)

(73) Assignee: Corsair Memory, Inc., Fremont, CA (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 15/179,691

(22) Filed: Jun. 10, 2016

(65) Prior Publication Data
US 2017/0045959 A1   Feb. 16, 2017

Related U.S. Application Data

(60) Provisional application No. 62/203,846, filed on Aug. 11, 2015.

(51) Int. Cl.
*G06F 3/0354* (2013.01)

(52) U.S. Cl.
CPC .. *G06F 3/03543* (2013.01); *G06F 2203/0333* (2013.01)

(58) Field of Classification Search
CPC ............. G06F 3/03543; G06F 3/03541; G06F 2203/0333
See application file for complete search history.

(56) References Cited

U.S. PATENT DOCUMENTS

| | | | | |
|---|---|---|---|---|
| 6,362,811 B1* | 3/2002 | Edwards | ............. | G06F 3/03543 248/118.1 |
| 6,717,569 B1* | 4/2004 | Gruhl | ................. | G06F 3/03543 345/157 |
| 2004/0222970 A1* | 11/2004 | Martinez | ................ | A63F 13/06 345/169 |
| 2010/0231514 A1* | 9/2010 | Min-Liang | .......... | G06F 3/03543 345/163 |
| 2013/0328781 A1* | 12/2013 | Pate | ...................... | G06F 3/0221 345/168 |

OTHER PUBLICATIONS

Cacho, Gieson, "Corsair launches new Strafe, Scimitar, Void gaming peripherals", Aug. 6, 2015, blogs.mercurynews.com, as retrieved from the wayback machine from URL http://blogs.mercurynews.com/aei/2015/08/06/corsair-launches-new-strafe-scimitar-void-gaming-peripherals/.*

* cited by examiner

*Primary Examiner* — Liliana Cerullo (57) ABSTRACT

A computer mouse with a translating module is disclosed. According to certain embodiments, the computer mouse is designed to work with different types of translating modules depending on the application that the user wishes to use or the types of tasks that the user would like to perform with the help of the computer mouse. According to certain embodiments, the translating module on the computer mouse can be adjusted based on a given user's hand characteristics and/or based on the ease of use of the computer mouse as determined by a given user.

8 Claims, 11 Drawing Sheets
(3 of 11 Drawing Sheet(s) Filed in Color)

MOUSE WITH TRANSLATING MODULE

CROSS-REFERENCE TO RELATED APPLICATIONS

The present application claims the benefit of U.S. Provisional Patent Application Ser. No. 62/203,846, filed Aug. 11, 2015 and entitled "Graphics Mouse With Translating Module," which is hereby incorporated by reference in its entirety.

NOTICE REGARDING COLOR DRAWINGS

The patent or application file contains at least one drawing executed in color. Copies of this patent or patent application publication with color drawing(s) will be provided by the Office upon request and payment of the necessary fee.

TECHNICAL FIELD

The present invention is directed to computer mouse architecture.

BRIEF DESCRIPTION OF THE DRAWINGS

The patent or application file contains at least one drawing executed in color. Copies of this patent application publication with color drawing(s) will be provided by the Office upon request and payment of the necessary fee.

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a design of a computer mouse includes an adjustable translating module that can be adjusted based on a given user's hand characteristics and/or based on the ease of use of the computer mouse as determined by a given user.

According to certain embodiments, the translating module can include but is not limited to switches, sensors, illuminations, and keys/buttons depending on the application of the mouse.

As a non-limiting example, the translating module can be locked into position to suit a specific user's preferences (e.g., User A). As another non-limiting example, User A can change the position of the translating module based on the nature of the task that the user is performing and that involves using the computer mouse. For example, the position of the translating module can change as tasks change. Also, the position of the translating module on the mouse can be changed for use by a different user (e.g., User B) based on the needs or preferences of User B.

According to certain embodiments, the switches/keys/buttons on the translating mouse can be configured by the user to map to specific functions. As non-limiting examples, the switches/keys/buttons on the translating mouse can be programmed for playing massively multiplayer online (MMO) games and/or multi player online battle arena (MOBA) games.

According to certain embodiments, the adjustable translating module can be adjusted based on a given user's hand characteristics such as the overall size of the hand or size of specific fingers of the user's hand, or the size of the palm of the hand, etc.

According to certain embodiments, the translating module has a travel range (for sliding the translating module back and forth) of 8 millimeters. According to certain embodiments, the translating module has a travel range anywhere between 10 millimeters and 6 millimeters. According to certain other embodiments, the translating module has a travel range anywhere between 12 millimeters and 4 millimeters.

According to certain embodiments, one or more of the switches/keys/buttons of the translating module can be contoured and/or textured based on ergonomic factors and/or haptic factors. Further, switches/keys/buttons of the translating module can include sound effects when the user presses on the keys, for example. According to certain, embodiments, the translating module can include illumination effects.

According to certain embodiments, the computer mouse is designed to work with different types of translating modules depending on the application that the user wishes to use or the types of tasks that the user would like to perform with the help of the computer mouse. In other words, a given translating module can be easily detached from the computer mouse and replaced with a different translating module. As a non-limiting example, the user can select a specific translating module for playing a specific computer game.

According to certain embodiments, the surfaces (e.g., keycaps) of the switches/keys/buttons of the translating module are removable so that a user can use different surfaces/keycaps on the translating module.

Figure 1:
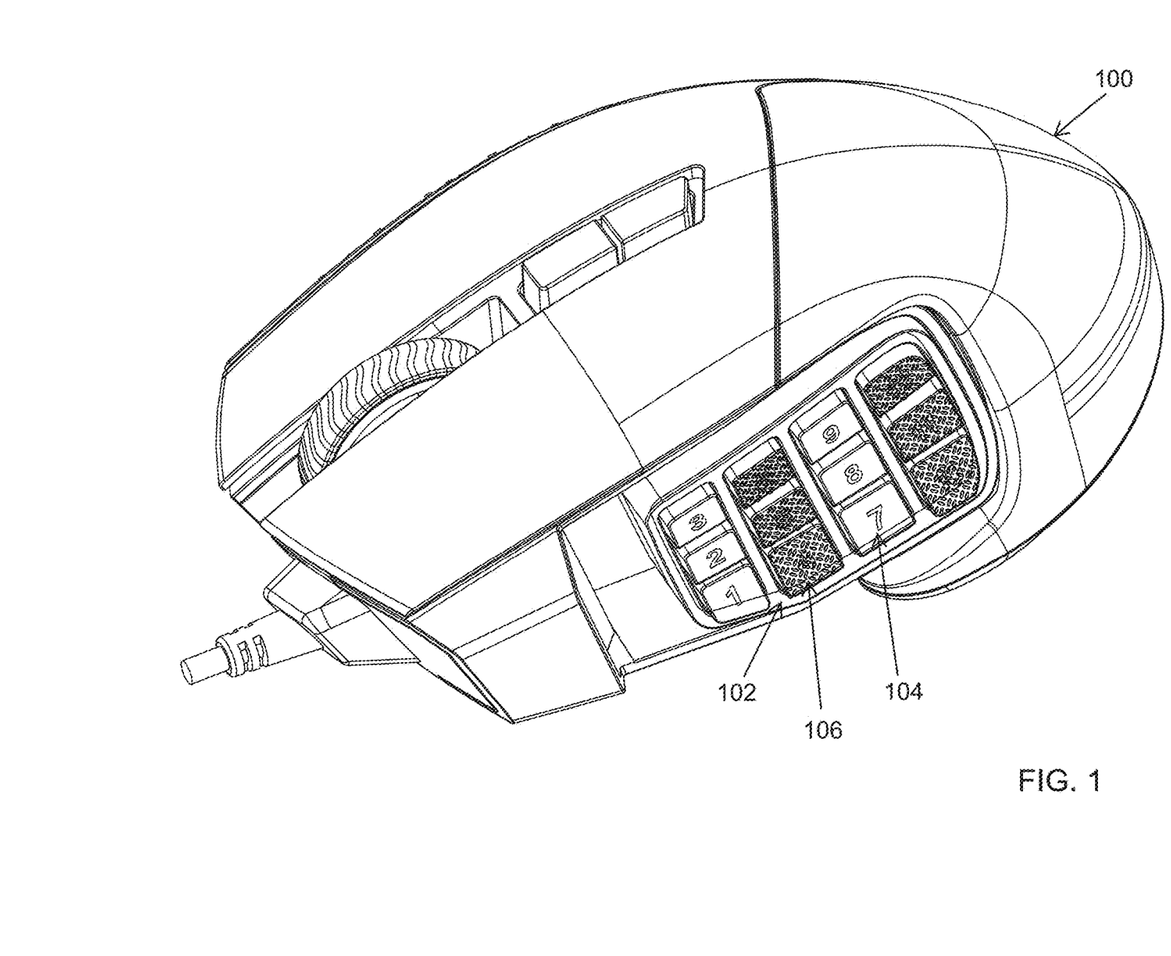
FIG. 1 illustrates a right perspective view of a computer mouse with a translating module, according to certain embodiments.

FIG. 1 illustrates a right perspective view of a computer mouse with a translating module, according to certain embodiments. FIG. 1 shows a computer mouse 100 with a translating module 102 at the side of computer mouse 100. Translating module 102 includes switches/keys/buttons (e.g., keys 104, 106). The surfaces of some of the switches/keys/buttons may be textured (e.g., key 106). Computer mouse 100, including the translating module, may include sensors (e.g., optical and laser sensors for tracking) and illumination effects (e.g., RGB lighting effects).

Figure 2:
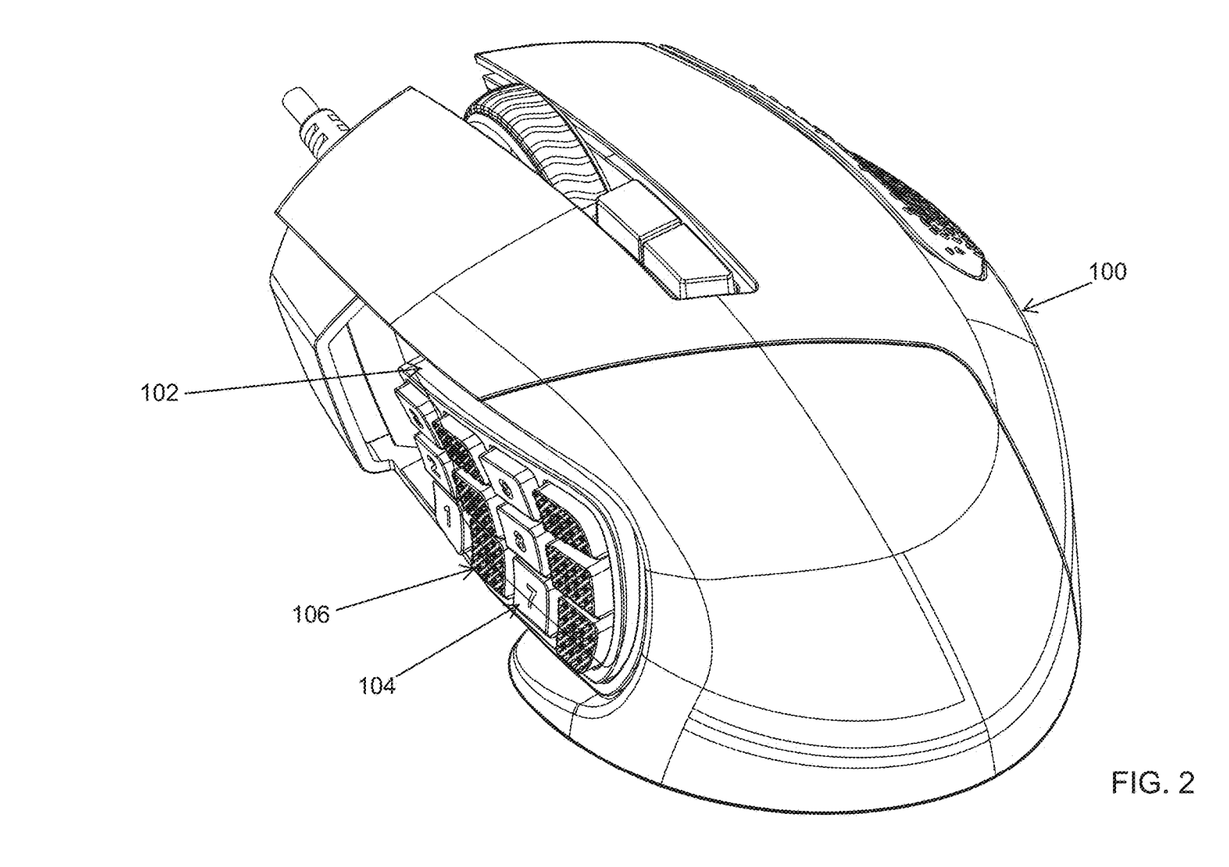
FIG. 2 illustrates a back perspective view of the computer mouse of FIG. 1 with the translating module, according to certain embodiments.

FIG. 2 illustrates a back perspective view of the computer mouse of FIG. 1 with the translating module, according to certain embodiments. FIG. 2 shows the computer mouse 100 with the translating module 102 at the side of computer mouse 100.

Figure 3:
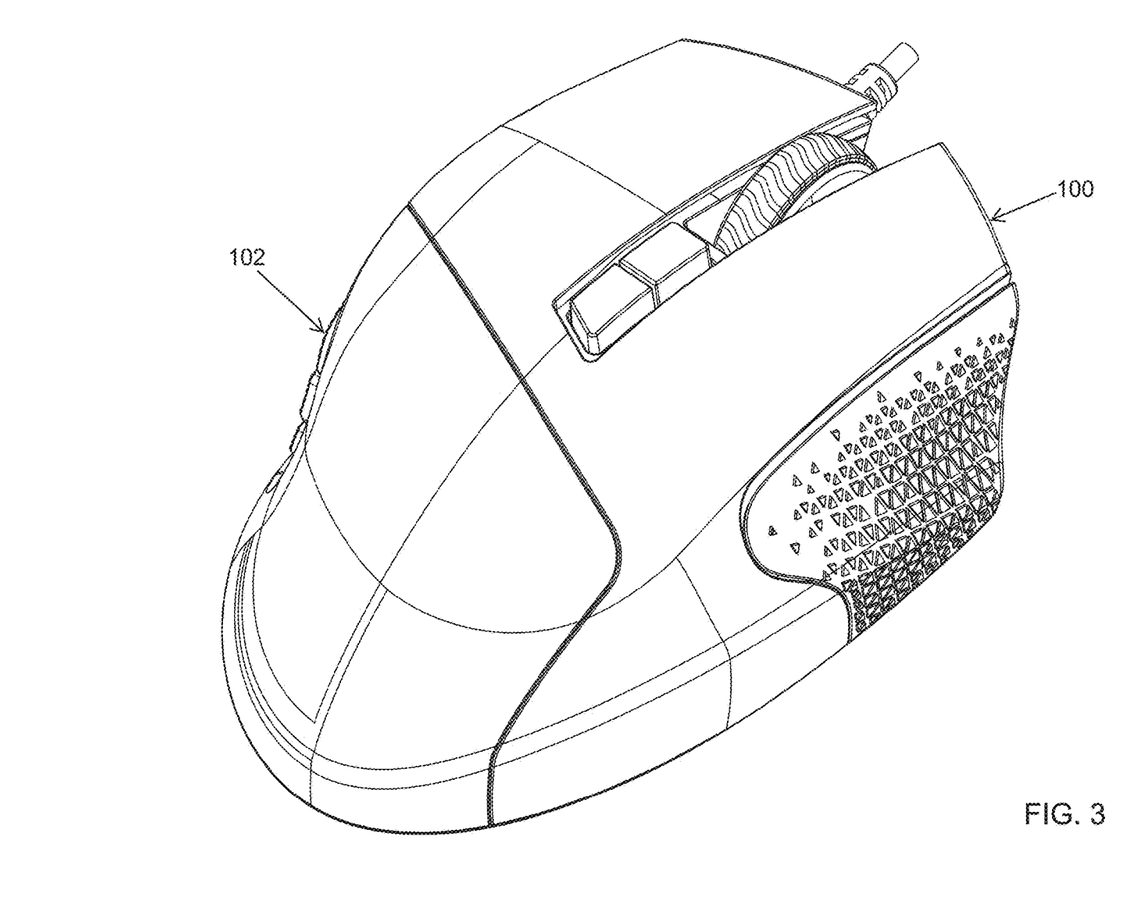
FIG. 3 illustrates a left perspective view of the computer mouse of FIG. 1 with the translating module, according to certain embodiments.

FIG. 3 illustrates a left perspective view of the computer mouse of FIG. 1 with the translating module, according to certain embodiments. FIG. 3 shows the computer mouse 100 with the translating module 102 at the side of computer mouse 100.

Figure 4:
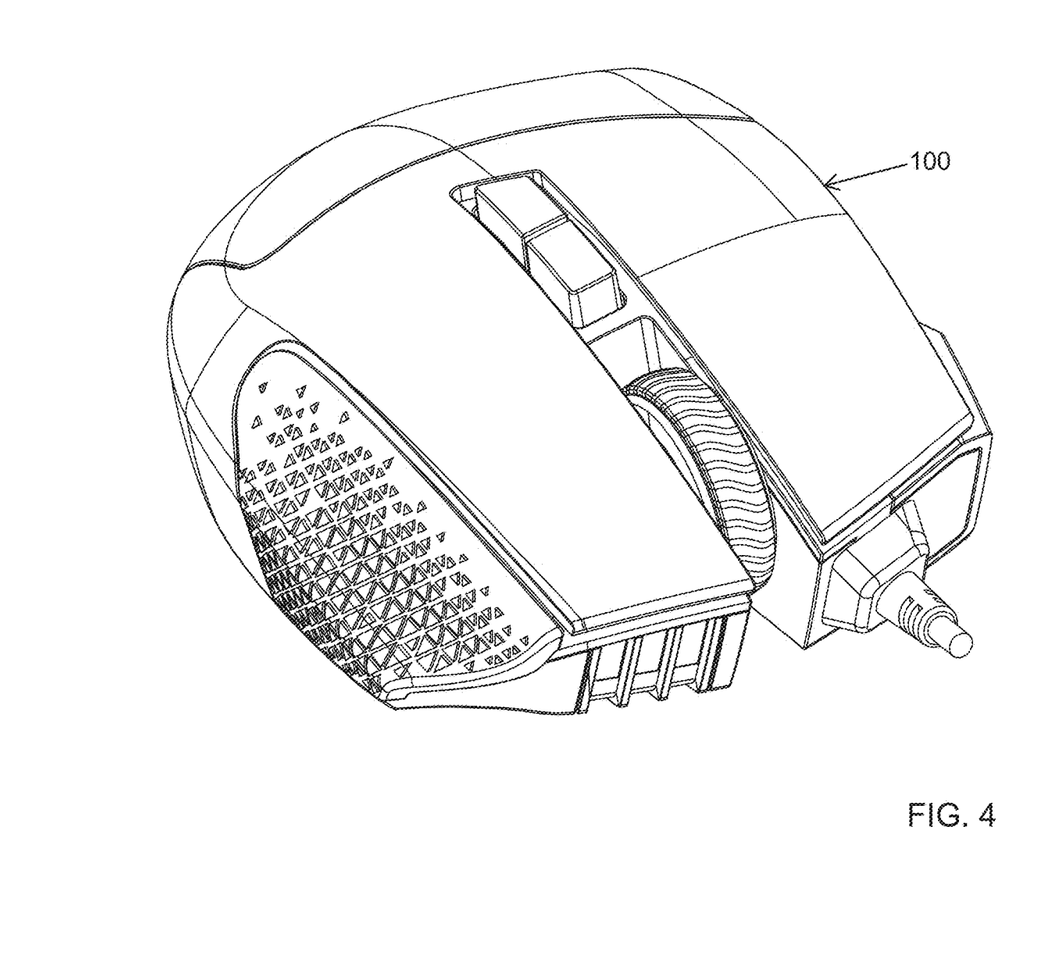
FIG. 4 illustrates a front perspective view of the computer mouse of FIG. 1 with the translating module, according to certain embodiments.

FIG. 4 illustrates a front left perspective view of the computer mouse of FIG. 1 with the translating module, according to certain embodiments. FIG. 4 shows the computer mouse 100 but the translating module is hidden from view since this is a left front perspective view.

Figure 5:
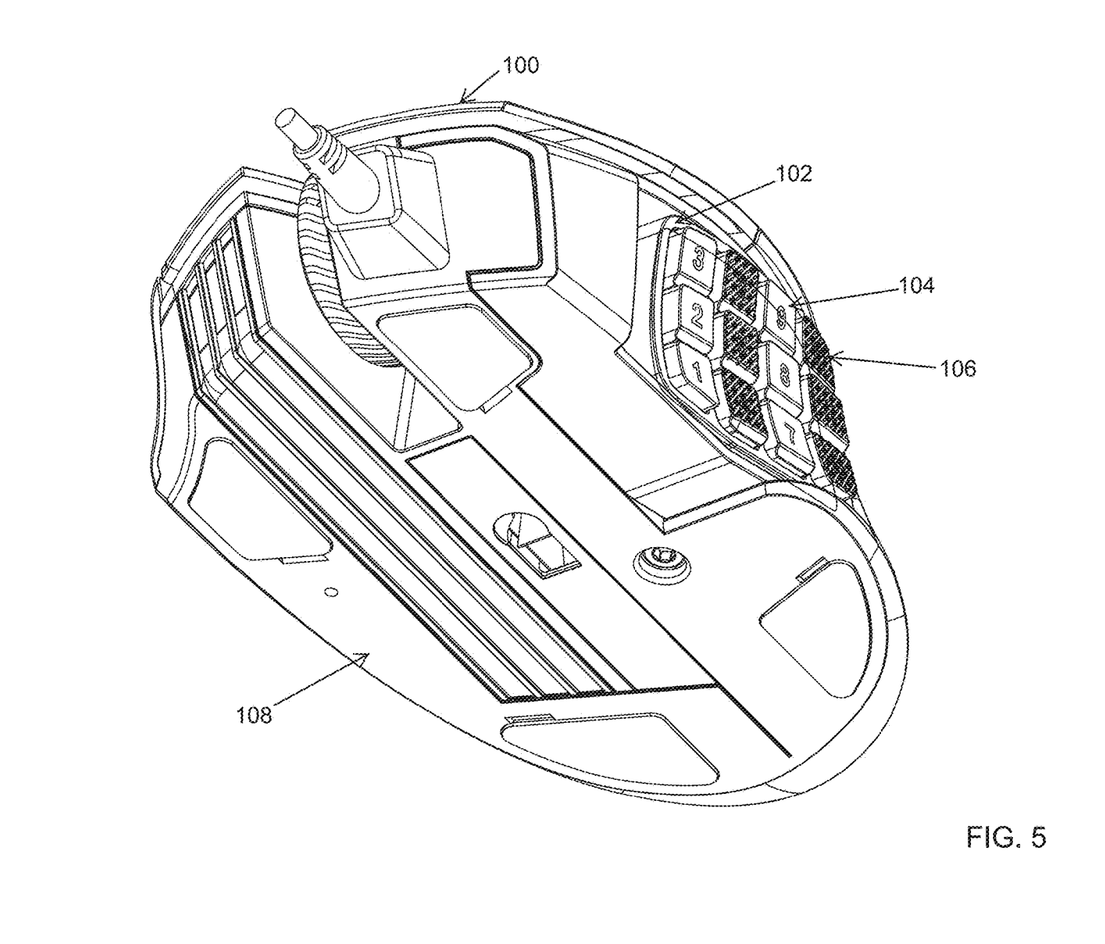
FIG. 5 illustrates a bottom perspective view the computer mouse of FIG. 1 with the translating module, according to certain embodiments.

FIG. 5 illustrates a bottom perspective view of the computer mouse of FIG. 1 with the translating module, according to certain embodiments. FIG. 5 shows the computer mouse 100 with the translating module 102 at the side of computer mouse 100. FIG. 5 also shows the bottom side 108 of computer mouse 100.

Figure 6:
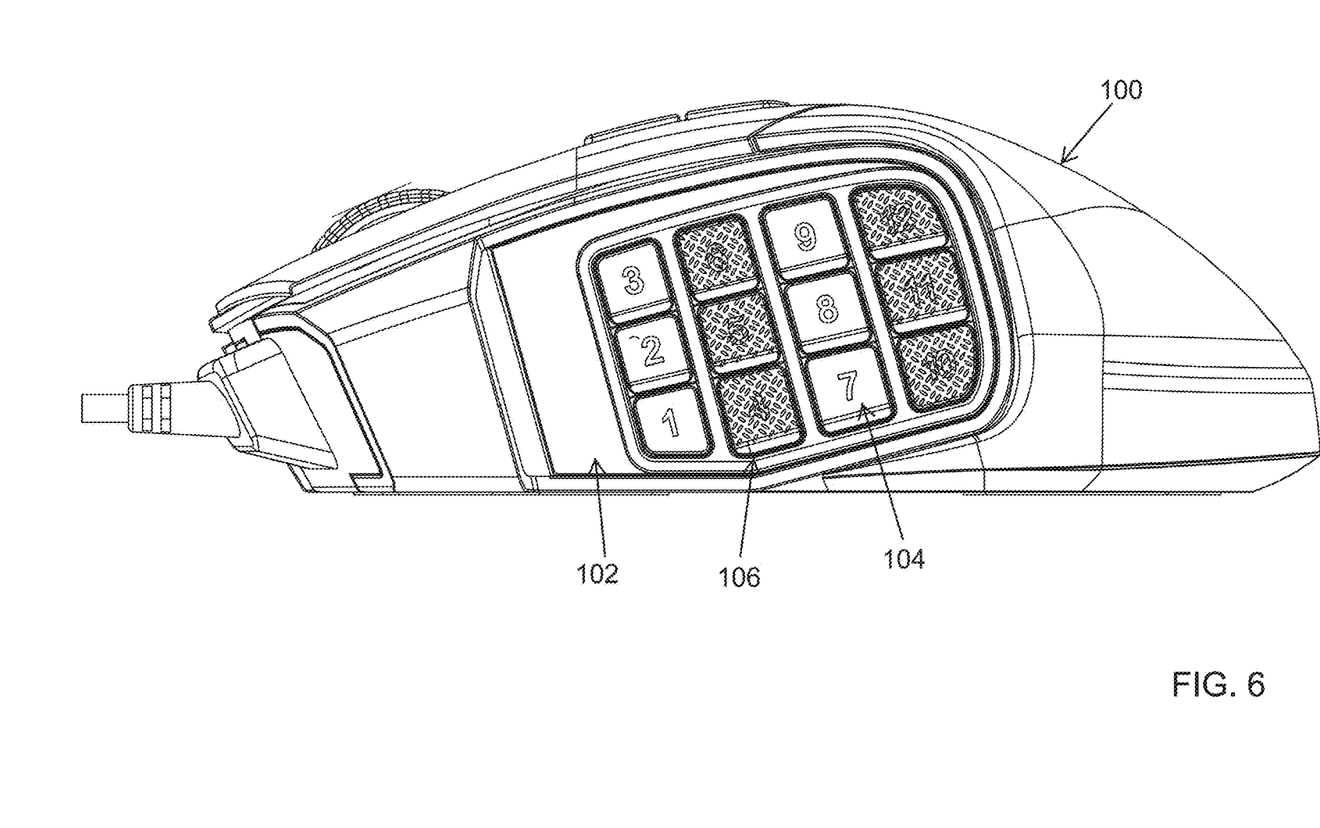
FIG. 6 illustrates a right side view of the computer mouse of FIG. 1 with the translating module, according to certain embodiments.

FIG. 6 illustrates a right side view of the computer mouse of FIG. 1 with the translating module, according to certain embodiments. FIG. 6 shows the computer mouse 100 with the translating module 102 at the side of computer mouse 100.

Figure 7:
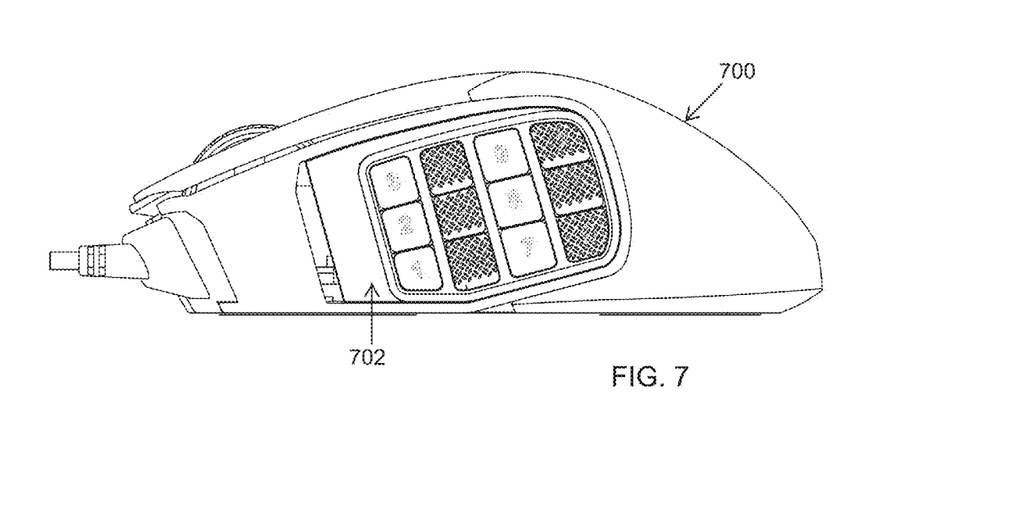
FIG. 7 illustrates a translating module in the backward position on the side of a computer mouse, according to certain embodiments.

FIG. 7 illustrates a translating module in the backward position on the side of a computer mouse, according to certain embodiments. FIG. 7 shows a computer mouse 700 with a translating module 702 that is in the backward position on the side of the computer mouse 700.

Figure 8:
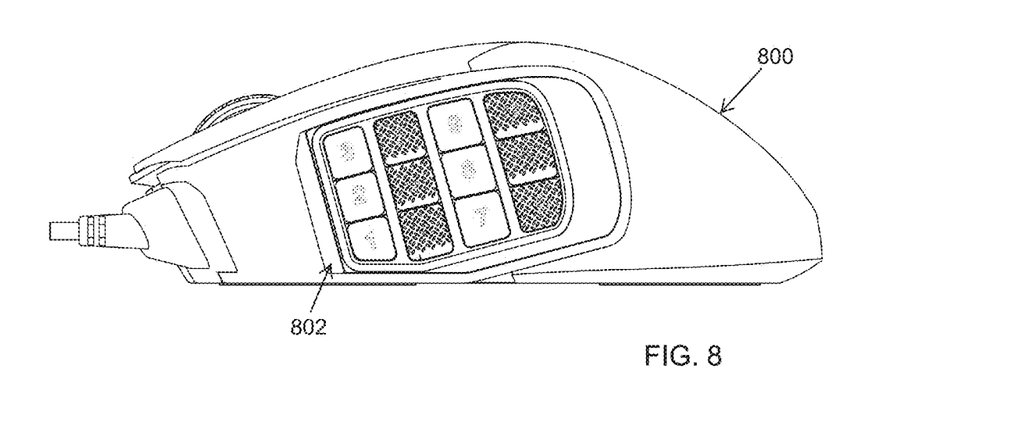
FIG. 8 illustrates a translating module in the forward position on the side of a computer mouse, according to certain embodiments.

FIG. 8 illustrates a translating module in the forward position on the side of a computer mouse, according to certain embodiments. FIG. 8 shows a computer mouse 800 with a translating module 802 that is in the forward position on the side of the computer mouse 800.

Figure 9:
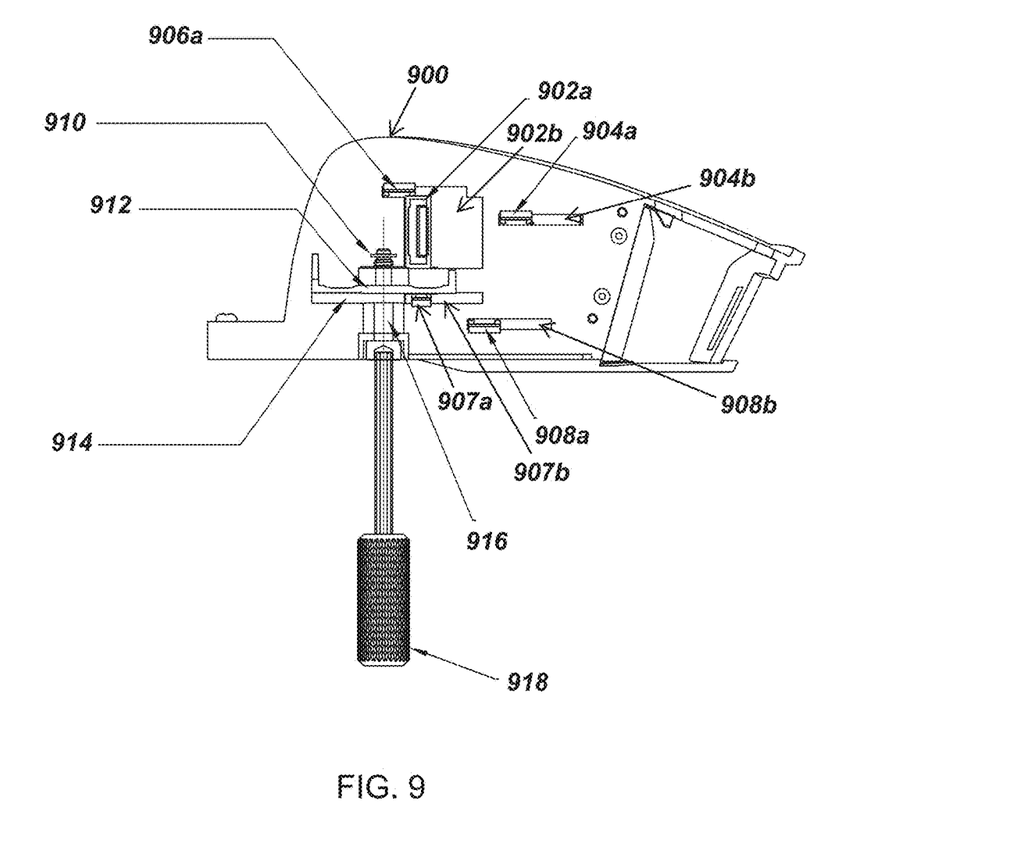
FIG. 9 illustrates a cross section of the translating module showing some of the components that comprise the translating mechanism of the translating module, according to certain embodiments.

FIG. 9 illustrates a cross section of the translating module showing some of the components that comprise the translating mechanism of the translating module, according to certain embodiments. In FIG. 9, a cross section of the translating module 900 shows a module connector 902a (e.g., a multi-pin connector) that can slide in a slot 902b, a snap 904a that can slide in a slot 904b, a snap 906a that can slide in a slot 902b, a snap 907a that can slide in a slot 907b, a snap 908a that can slide in a slot 908b, a washer 910 (e.g., E type washer), a slider clamp mechanism 912, a brake plate 914 that, a screw 916. Screw 916 can be tightened to lock the translating module into a desired position selected by the user. FIG. 9 also shows a screwdriver 918 but the screwdriver is not part of the module. The screwdriver is shown to illustrate that screw 916 can be tightened to lock the translating module into a desired position. Similarly, screw 916 can be loosened to allow the translating module to slide into a different desired position selected by the user. Once the translating module is at a desired position, screw 916 can be tightened to lock the translating module into place. Brake plate 914 and screw 916 together restrict the travel range of the translating module.

Figure 10A:
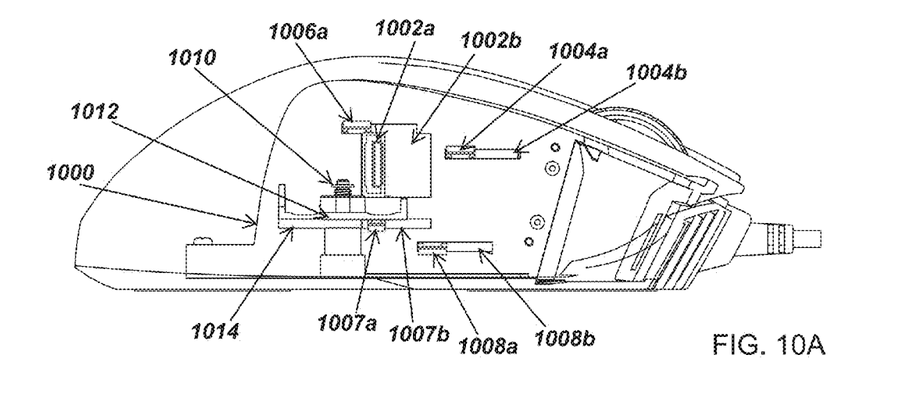
FIG. 10A illustrates a cross section of the translating module in the backward position and attached to the side of a computer mouse, according to certain embodiments.
Figure 10B:
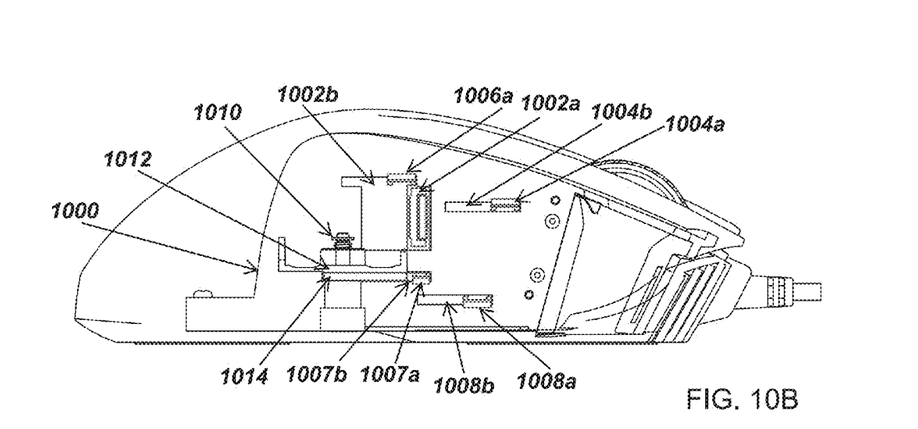
FIG. 10B illustrates a cross section of the translating module in the forward position and attached to the side of a computer mouse, according to certain embodiments.

FIG. 10A illustrates a cross section of the translating module in the backward position and attached to the side of a computer mouse, according to certain embodiments. FIG. 10B illustrates a cross section of the translating module in the forward position and attached to the side of a computer mouse, according to certain embodiments. FIG. 10A and FIG. 10B show inner frame 1000 of the translating module that includes slot 1002b to accommodate snap 1006a and module pin connector 1002a, slot 1004b to accommodate snap 1004a, slot 1007b to accommodate snap 1007a, slot 1008b to accommodate snap 1008a, washer 1010, a slider mechanism 1012, and brake plate 1014.

In FIG. 10A, snaps (1004a, 1006a, 1007a, 1008a), brake plate 1014 and module pin connector 1002a are shown at a backward position. In FIG. 10B, snaps (1004a, 1006a, 1007a, 1008a), brake plate 1014 and module pin connector 1002a are shown at a forward position. Snaps (1004a, 1006a, 1007a, 1008a), brake plate 1014 and module pin connector 1002a can slide into any desired position within their respective slots.

Figure 11:
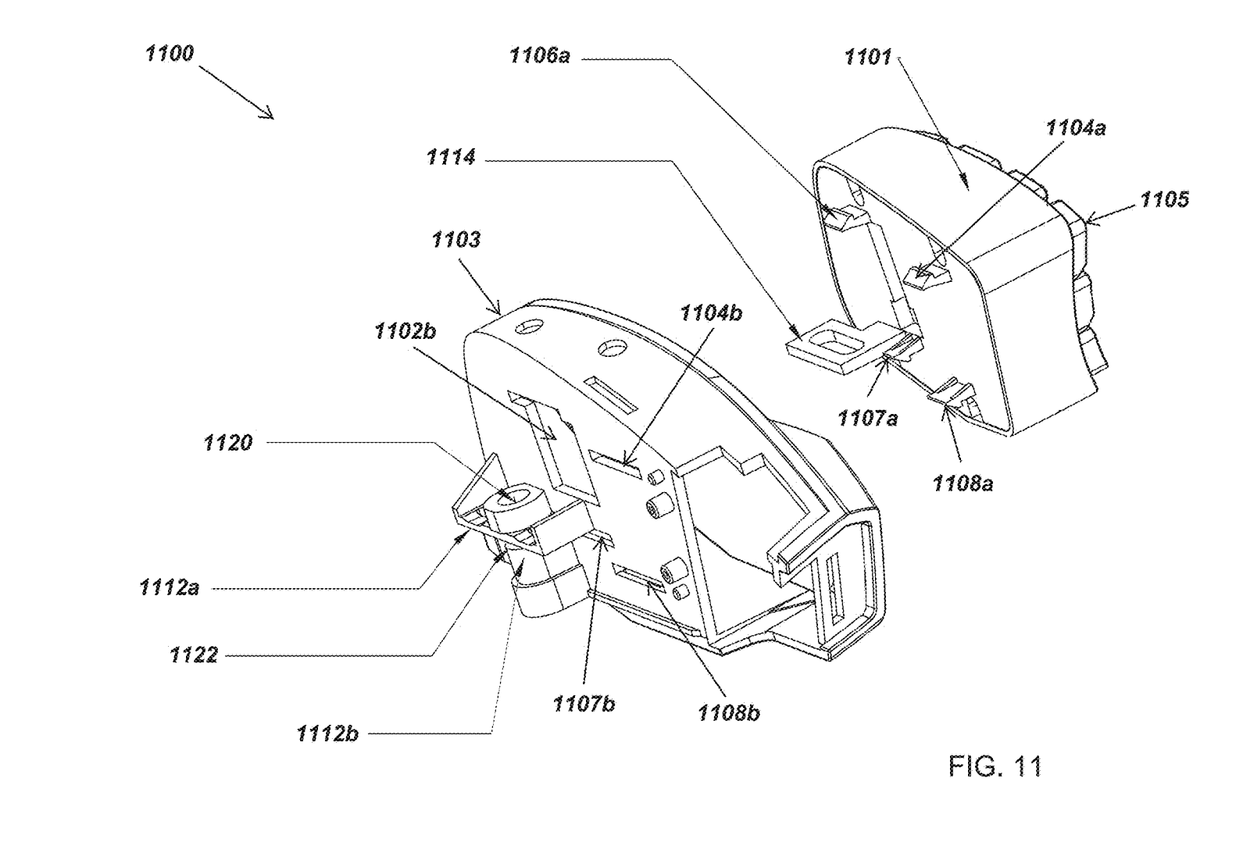
FIG. 11 is an exploded view of a translating module of a computer mouse showing some of the components of the sliding mechanism associated with the translating module, according to certain embodiments.

FIG. 11 is an exploded view of a translating module of a computer mouse showing some of the components of the sliding mechanism associated with the translating module, according to certain embodiments. FIG. 11 shows the outer frame 1101 of the translating module 1100, the inner frame 1103 of the translating module 1100, keys 1105, snaps (1104a, 1106a, 1107a, 1108a), brake plate 1114, slots (1102b, 1104b, 1107b, 1108b), upper slider clamper 1112a, lower slider clamper 1112b, nut 1120, and space for brake plate 1122.

Figure 12:
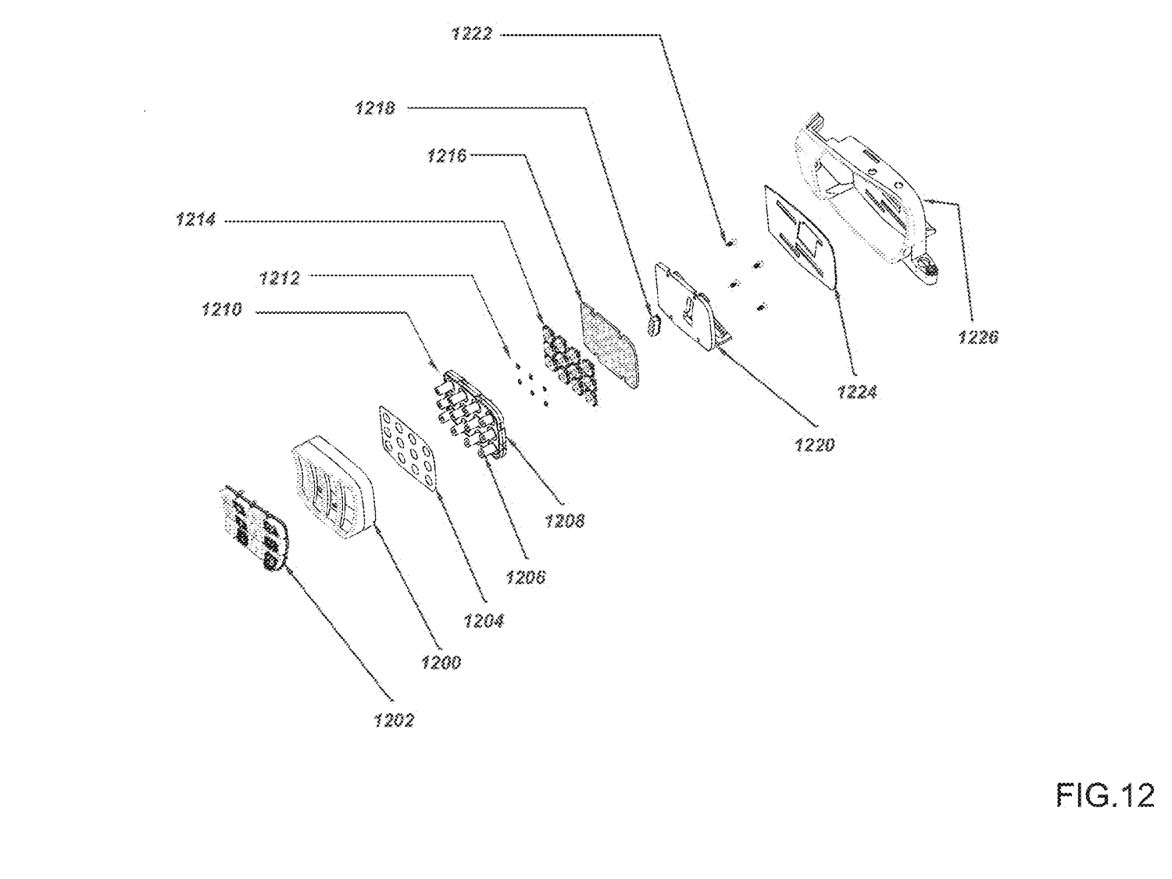
FIG. 12 is an exploded view of a translating module of a computer mouse showing some of the components associated with the outer frame of the translating module, according to certain embodiments.

FIG. 12 is an exploded view of a translating module of a computer mouse showing some of the components associated with the outer frame of the translating module, according to certain embodiments. FIG. 12 shows translating module frame 1200, key caps 1202, diffuser film 1204, transparent silicone rubber mounts 1206, transparent polycarbonate (PC) frame 1208, P+R module insert molding 1210, pins SMT RGB LEDs 1212, switches 1214, printed circuit board (PCB) 1216, module pin connector 1218, back cover (PC-ABS acrylonitrile-butadiene-styrene) 1220, screws 1222, Aluminum+Hair Line+Silver anodized cover 1224, and inner frame 1126 of the translating module.

A method of constructing a computer mouse device comprises making a main body frame of the computer mouse device; making a first translating module; disposing the first translating module on a side of the main body frame, the first translating module comprising a key pad and wherein the keypad is movably slidable within a predetermined travel range along the side of the main body frame.

The method of constructing a computer mouse device further comprises making an outer frame and an inner frame as part of the translating module, where the inner frame includes attachment slots along which corresponding attachment snaps that are associated with the outer frame can slide within the predetermined range of travel.

The method of constructing a computer mouse device further comprises including one or more operable keys, buttons and/or switches in the first translating module.

The method of constructing a computer mouse device further comprises making the one or more operable keys, buttons and switches are configurable for mapping to specific functions associated with the computer mouse device.

The method of constructing a computer mouse device further comprises including illumination effects in the first translating module.

The method of constructing a computer mouse device further comprises making the first translating module detachable from the main body frame so that the first translating module is replaceable with a second translating module, where the second translating module has one or more functions and features that are distinct from that of the first translating module.

The method of constructing a computer mouse device further comprises incorporating a set of ergonomic features and haptic features into the first translating module.

The method of constructing a computer mouse device further comprises making the one or more operable keys, buttons and switches detachable for replacement with other operable keys, buttons and switches.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A computer mouse device comprising:

a main body frame of the computer mouse device;

a top component disposed on a top side of the main body frame for supporting a palm of a user's hand; and a first translating module disposed on a right side of the main body frame, the first translating module comprising a key pad and wherein the keypad is movably slidable such that the keypad slides in a translating movement within a predetermined travel range along the right side of the main body frame to arrive at a fixed position selected by the user within the predetermined travel range, the fixed position based on finger length of the user's hand.

2. The computer mouse device of claim 1, wherein the first translating module comprises an outer frame and an inner frame, wherein:

the inner frame includes attachment slots along which corresponding attachment snaps that are associated with the outer frame slide within the predetermined travel range.

3. The computer mouse device of claim 1, wherein the first translating module includes one or more operable keys, buttons and switches.

4. The computer mouse device of claim 3, wherein the one or more operable keys, buttons and switches are configurable for mapping to specific functions associated with the computer mouse.

5. The computer mouse device of claim 1, wherein the first translating module includes illumination effects.

6. The computer mouse device of claim 1, wherein the first translating module is detachable from the main body frame and is replaceable with a second translating module, where the second translating module has one or more functions and features that are distinct from that of the first translating module.

7. The computer mouse device of claim 1, wherein the first translating module incorporates a set of ergonomic features and haptic features.

8. The computer mouse device of claim 3, wherein the one or more operable keys, buttons and switches are detachable for replacement with other operable keys, buttons and switches.

* * * * *